(12) United States Patent
Magielse et al.

(10) Patent No.: US 10,834,796 B2
(45) Date of Patent: Nov. 10, 2020

(54) LIGHTING CONTROL

(71) Applicant: SIGNIFY HOLDING B.V., Eindhoven (NL)

(72) Inventors: Remco Magielse, Eindhoven (NL); Daniel Martin Georgen, Eindhoven (NL); Leendert Teunis Rozendaal, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/334,252

(22) PCT Filed: Sep. 14, 2017

(86) PCT No.: PCT/EP2017/073114
§ 371 (c)(1),
(2) Date: Mar. 18, 2019

(87) PCT Pub. No.: WO2018/054752
PCT Pub. Date: Mar. 29, 2018

(65) Prior Publication Data
US 2019/0230769 A1     Jul. 25, 2019

(30) Foreign Application Priority Data
Sep. 20, 2016   (EP) .................................... 16189606

(51) Int. Cl.
*H05B 47/105* (2020.01)
*H05B 47/12* (2020.01)
*H05B 47/16* (2020.01)

(52) U.S. Cl.
CPC ........... *H05B 47/105* (2020.01); *H05B 47/12* (2020.01); *H05B 47/16* (2020.01); *Y02B 20/44* (2013.01)

(58) Field of Classification Search
CPC ............ H05B 33/0842; H05B 33/0884; H05B 33/0845; H05B 33/0854; H05B 37/0227;
(Continued)

(56) References Cited

U.S. PATENT DOCUMENTS

| 4,636,774 A | 1/1987 | Galvin et al. |
| 5,640,143 A | 6/1997 | Myron et al. |
(Continued)

FOREIGN PATENT DOCUMENTS

| CN | 204244530 U | 4/2015 |
| EP | 0958562 B1 | 11/2005 |
(Continued)

*Primary Examiner* — Renan Luque
(74) *Attorney, Agent, or Firm* — Akarsh P. Belagodu (57) ABSTRACT

A method of controlling one or more luminaires arranged to illuminate an area covered by at least one presence sensor, the method comprising: receiving from a user a selection of a lighting scene to be rendered; controlling at least one of the luminaires to render the selected lighting scene; determining a timeout duration for the luminaires based on the selected lighting scene; using the at least one presence sensor to monitor the area for presence indicators when rendering the selected lighting scene; and automatically switching the luminaires to a low-power mode if no presence indicator is detected in the area for the determined timeout duration when rendering the selected lighting scene.

14 Claims, 3 Drawing Sheets

(58) Field of Classification Search
CPC . H05B 37/0281; H05B 37/0236; Y02B 20/44
See application file for complete search history.

(56) References Cited

U.S. PATENT DOCUMENTS

| | | | |
|---|---|---|---|
| 2006/0125624 A1* | 6/2006 | Ostrovsky | H05B 37/0227 340/527 |
| 2012/0025717 A1 | 2/2012 | Klusmann et al. | |
| 2013/0134883 A1* | 5/2013 | Weng | H05B 33/0854 315/122 |
| 2014/0265875 A1 | 9/2014 | Nelson et al. | |
| 2015/0296594 A1* | 10/2015 | Blum | H05B 37/0227 315/158 |
| 2016/0374177 A1* | 12/2016 | Chen | H05B 37/0218 |

FOREIGN PATENT DOCUMENTS

| | | | | |
|---|---|---|---|---|
| EP | 2955979 A2 | 12/2015 | | |
| WO | WO-2010079388 A1 * | 7/2010 | | H04W 64/00 |
| WO | 2011087681 A1 | 7/2011 | | |
| WO | 2014204286 A1 | 12/2014 | | |

* cited by examiner

LIGHTING CONTROL

CROSS-REFERENCE TO PRIOR APPLICATIONS

This application is the U.S. National Phase application under 35 U.S.C. § 371 of International Application No. PCT/EP2017/073114, filed on Sep. 14, 2017, which claims the benefit of European Patent Application No. 16189606.3, filed on Sep. 20, 2016. These applications are hereby incorporated by reference herein.

TECHNICAL FIELD

The present disclosure relates to systems and methods for controlling luminaires, i.e. lighting devices, to render a lighting scene in an environment.

BACKGROUND

Electronic devices are becoming ever more connected. A "connected" device refers to a device—such as a user terminal, or home or office appliance or the like—that is connected to one or more other such devices via a wireless or wired connection in order allow more possibilities for control of the device. For instance, the device in question is often connected to the one or more other devices as part of a wired or wireless network, such as a Wi-Fi, ZigBee or Bluetooth network. The connection may for example allow control of the device from one of the one or more other devices, e.g. from an app (application) running on a user device such as a smart phone, tablet or laptop; and/or may allow for sharing of sensor information or other data between the devices in order to provide more intelligent and/or distributed automated control.

In recent years, the number of connected devices has increased dramatically. Lighting systems are part of this movement towards a connected infrastructure. Conventional connected lighting systems consist of fixed light sources, which can be controlled through wall-mounted switches, dimmers or more advanced control panels that have pre-programmed settings and effects, or even from an app running on a user terminal such as a smart phone, tablet or laptop. For example, this may allow a user to create an ambiance using a wide range of colored lighting, dimming options and/or dynamic effects. In terms of control the most common approach is to replace a light switch with a smartphone based app that offers extended control over lighting (for example Philips hue, LIFX, etc.).

In recent years, LED-based lighting solutions have been developed. These are able to provide additional features, above and beyond those of traditional lighting (e.g. incandescent, CFL) technologies. These include, among others, the possibility of tuning the color temperature (e.g. from warm white to cool white) and/or creating a large gamut of colors. For example, the Philips Hue family of products allow for both options: temperature tuning from 2200K to 6500K and around 16 million possible color combinations.

One of the main drivers for this development is allowing customers to go beyond the common use of lighting (either fixed brightness or dimmable brightness) and use these lamps for what is known as mood setting: adapt the lighting in a specific room to match certain decoration, use color combinations to highlight areas and hide others, increase the feeling of warmth or induce higher concentration or energy in users etc.

Mood setting is a key element in modern lighting systems and can be achieved by means of lighting "scenes". A lighting scene is a particular overall lighting effect in an environment rendered by the light sources in that environment. E.g. a "sunset" scene may be defined in which the light sources are set to output hues in the red-yellow range of the visible spectrum. Each light source may for example output the different hues (or other setting such as saturation or intensity), or a scene may be rendered by all (or some) lights rendering a single color or similar colors. Note that lighting scenes may be dynamic in that the output of one or more light source changes over time.

Each scene is defined by a respective set of configuration data (scene data set) for a group lamps that belong to that scene, i.e. to which that scene data set relates. The lamp(s) may be of one luminaire or spread across multiple luminaires. The scene data set contains information on which lamps belong to it and defines one or more illumination settings for those lamps. E.g. color setting(s) and/or brightness setting(s), such as a color point and/or a brightness at which each of the lamps is set. Settings in a scene data set may be global (applying to all lamps in the group), individual (applying to only a single lamp in the group), or somewhere in between (applying to a subset of lamps). Users can have multiple scenes configured for each of the possible moods they want to represent (or other ambiance-creating scenarios), and select between them as desired.

Connected lighting systems are able to render lighting scenes by receiving lighting instructions over the network (e.g. a ZigBee network) from, for example, a user device such as a smart phone, and interpret the lighting instructions in order to determine the appropriate lighting settings for each light source in order that the lighting system renders a desired lighting scene in the environment.

From a technological point of view this is enabled not only by the lighting capabilities of the lamps but also by a smart system that can control them according to inputs from users and which communicates internally using a wired (e.g. DMX, DALI) or wireless (e.g. ZigBee) mechanism. Due to this a user can transfer, with minimum effort, the desired configuration or scene recall to all the involved elements. This is referred to in the art as "connected lighting", and is particularly advantageous as a user may wish to recall particular scenes to accompany particular activities. For example, a "workout" lighting scene for physical activity, or a "sunset" lighting scene at bedtime.

SUMMARY

Many lighting systems comprise presence sensors such as motion sensors. Typically, a motion sensor (in the default setting) will switch on lights when it detects motion and—if for a certain period of time no motion has been detected—will turn off lights.

Existing presence sensors are manually set or use a self-learning method to determine the length of the period after activation (i.e. detecting presence) before determining that there is no longer someone present. For example, in a hallway a user may set the delay to 1 minute (as people generally just pass by) whereas in an office it may be set to 30 minutes (as people sit behind a desk and do not move much).

However, setting the correct time before 'turning off' the lights is a delicate balance between energy consumption (you don't want the lights to stay on too long) and user annoyance (not too short so the user is in the dark when he is not moving).

The present invention recognizes that a selection of a particular lighting scene by a user to be rendered by luminaires in an area implicitly provides some information regarding an activity in that area. Hence, the present invention adapts the duration of a timeout delay of the lights based on a lighting scene being rendered by the luminaires in response to selection by a user. For example, a "sunset" lighting scene typically is selected by a user in the evening when there is only a low level of activity in the area. Hence, the timeout delay can be lengthened in order to avoid prematurely turning off the luminaires. As another example, an "energize" lighting scene typically is selected by a user for more lively activities such as exercise. Hence, the timeout delay can be shortened to avoid unnecessarily keeping the luminaires on for a long time after the activity has ended. For the avoidance of doubt, it is noted that the user does not explicitly set the timeout duration when selecting the scene. Rather, an appropriate timeout duration is inferred from his scene selection.

Embodiments of the present invention infer an activity type from the lighting scene selection by the user and to adapt the timeout delay of the luminaires accordingly based on the inferred activity.

There are other, additional sources of information that can be used in this determination of the activity. For example, in further embodiments, the user may be allowed to manually set information about their current activity in a room or type of room. Based on this activity the system can intelligently adapt the timing delay behavior of a sensor. This can either be a predefined time out for every activity (e.g., 5 minutes), or the user-defined time out may be modified for an activity (e.g., twice as long). For example, a "default" user-set timeout duration may be adapted automatically based on his current scene selection.

According to a first aspect disclosed herein, there is provided a method of controlling one or more luminaires arranged to illuminate an area covered by at least one presence sensor, the method comprising: receiving from a user a selection of a lighting scene to be rendered; controlling at least one of the luminaires to render the selected lighting scene; determining a timeout duration for the luminaires based on the selected lighting scene; using the at least one presence sensor to monitor the area for presence indicators when rendering the selected lighting scene; and automatically switching the luminaires to a low-power mode if no presence indicator is detected in the area for the determined timeout duration when rendering the selected lighting scene.

In embodiments, the presence indicators comprise one or more of: movement within the area; heat sources within the area; and sound sources within the area.

In embodiments, the luminaires are switched to low-power mode by switching them to a non-emitting state.

In embodiments, the luminaires are switched to low-power mode by reducing a luminous intensity of the luminaires.

In embodiments, the method comprises determining an activity in the area based on the selected lighting scene and wherein said timeout duration for the luminaires is determined based on the determined activity.

In embodiments, the activity is also determined based on at least one brightness, hue, or saturation of the selected lighting scene.

In embodiments, the activity is also determined based on a name or type of the selected lighting scene. For example, a plaintext name of the scene, an ID of the scene selected by the user which is stored in memory.

In embodiments, the activity in the area is further determined based on an area type of said area.

In embodiments, the activity in the area is further determined based a time of day.

In embodiments, the activity in the area is further based on data indicating an application being used in the area.

In embodiments, the determining of the timeout duration comprises determining a timeout multiplier based on the selected lighting scene and applying the timeout multiplier to a default timeout duration.

In embodiments, the area type of said area is manually entered by the user.

In embodiments, the area type of said area is automatically detected.

According to a second aspect disclosed herein, there is provided controller for controlling one or more luminaires arranged to illuminate an area covered by at least one presence sensor, the controller comprising: a scene selection module arranged to receive from a user a selection of a lighting scene to be rendered; a lighting control module arranged to control at least one of the luminaires to render the selected lighting scene; a timeout determination module arranged to determine a timeout duration for the luminaires based on the selected lighting scene; a monitoring module arranged to use at least one presence sensor to monitor the area for presence indicators when rendering the selected lighting scene; wherein the lighting control module is arranged to switch the luminaires to a low-power mode if no presence indicator is detected in the area for the determined timeout duration when rendering the selected lighting scene.

According to a third aspect disclosed herein, there is provided a computer program product comprising computer-executable code embodied on a computer-readable storage medium configured so as when executed by one or more processing units to perform the method according to first aspect or any embodiment thereof.

BRIEF DESCRIPTION OF THE DRAWINGS

To assist understanding of the present disclosure and to show how embodiments may be put into effect, reference is made by way of example to the accompanying drawings in which.

DETAILED DESCRIPTION OF EMBODIMENTS

In state-of-the-art lighting systems which comprise a sensor, the default timing aspects of when to switch on and off lights is based at most on the type of room that the motion sensor is installed in. A 'Hallway' has a shorter 'grace period' than a 'Living Room'. However, the room type may not be the (only) determining factor in the timing of the sensor. One particularly important factor is the type of lighting scene being rendered in the room as it may be indicative of a type of activity being performed by a user in that room. For example: a user selecting a workout scene can cause the delay to be set to 1 minute, whereas a relax scene may set the delay to 1 hour.

The adjustment to the delay can be applied directly or absolutely (e.g. watching television sets the delay to 10 minutes) or relatively such as by a multiplier (e.g. watching television sets the delay to 3 times the usual for the room type the sensor is in).

Figure 1:
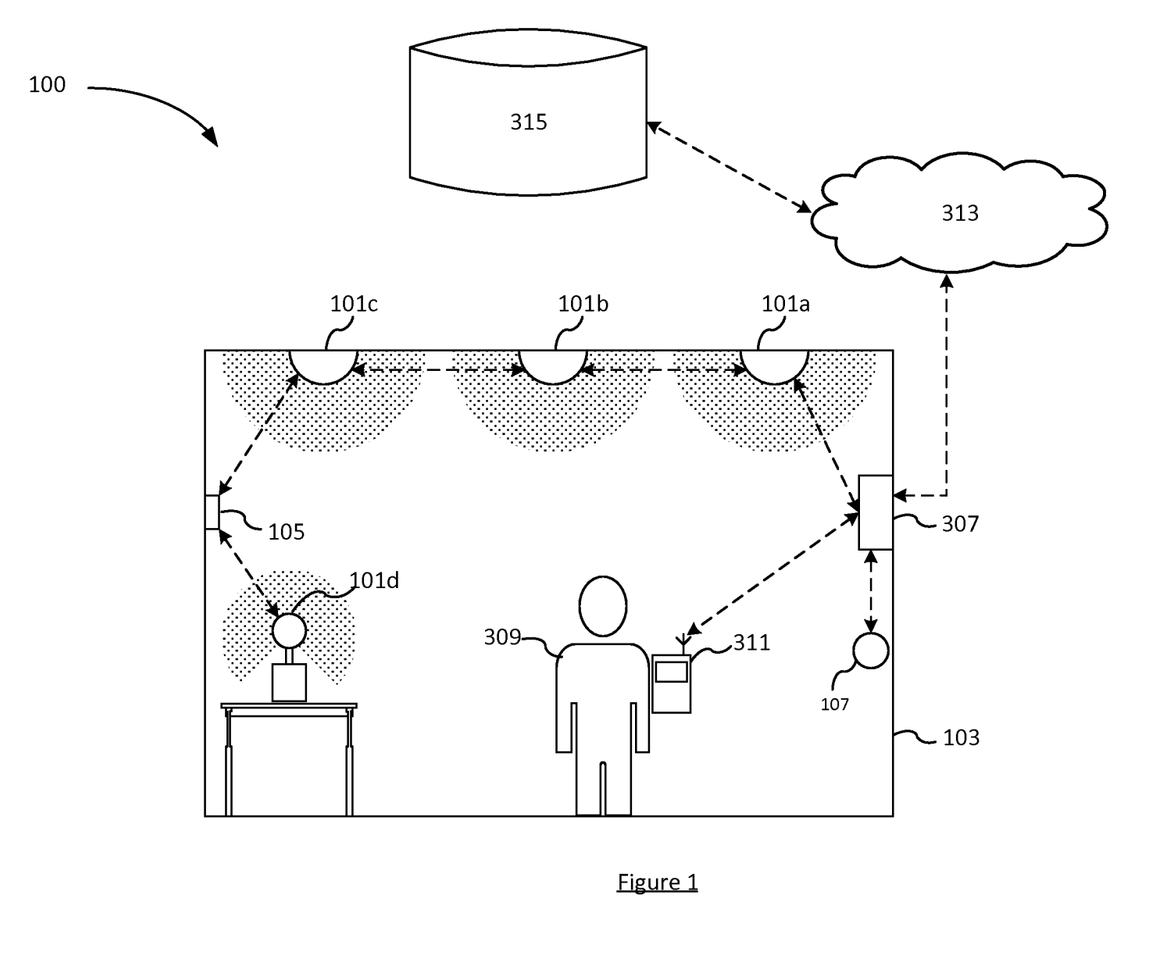
FIG. 1 shows a system according to embodiments of the present invention.

FIG. 1 shows a lighting system 100 according to embodiments of the present invention. An environment 103 contains a plurality of luminaires 101a-d and a switch 105. Luminaires 101a-c are ceiling type luminaires designed to provide illumination in the environment 103 from above. Luminaire 101d is a free-standing lamp type luminaire placed on a table designed to provide illumination in the environment 103 from a lower position than the ceiling type luminaires 101a-c. Each of the luminaires 101a-d comprises at least one respective lamp such as an LED-based lamp, gas-discharge lamp or filament bulb, plus any associated housing or support. Each of the luminaires 101a-d may take any suitable form such as a ceiling or wall mounted luminaire, a free standing luminaire, a wall washer, or a less conventional form such as a luminaire built into a surface or an item of furniture, or any other type of illumination device for emitting illumination into the environment 103 so as to illuminate the environment 103.

The plurality of luminaires 101a-d may comprise more than one type of luminaire, or each luminaire 101a-d may be of the same type.

The switch 105 is shown in FIG. 1 as a wall-mounted switch and may be any suitable type of switch allowing user input to control the plurality of luminaires 101a-d. For example, the switch 105 may be a simple on-off controller switch or may allow for more complex control such as dimming and possibly even control of individual lighting characteristics such as hue and saturation. The switch 105 may also be a portable switch (portable remote control) capable of being moved from one environment to another. The term "switch" is used herein to refer to any control device allowing a user to input commands into the lighting system.

The plurality of luminaires 101a-d, the switch 105, along with a lighting bridge 307 form a connected lighting network. That is, they are all interconnected by wired and/or wireless connections, indicated by dotted lines in FIG. 1. In particular, FIG. 1 shows "chaining" connections such as may be implemented in a ZigBee lighting network, wherein it is not necessary for each device to be directly connected to each other device. Instead, devices are able to relay communication signals which allows for, for example, luminaire 101c to communicate with the lighting bridge 307 by relaying data through luminaires 101b and 101a to lighting bridge 307. However, it is not excluded that other network topologies may be employed. For example, a "hub-and-spoke" topology may be used in which each device is directly connected (e.g. wirelessly) to the lighting bridge 307 and not to any other devices in the network.

As another example, each luminaire in the network may be configured according to one communication protocol, such as ZigBee, and the switches may be configured according to another communication protocol, such as WiFi. Hence, it is appreciated that the luminaires may communicate with each other and the lighting bridge 307 without relaying data through a switch as shown in FIG. 1, and the switch 105 may communicate directly with the lighting bridge 307. In any case, it is understood that the lighting bridge 307 is able to communicate, by whatever appropriate means, with each other device in the lighting network.

Lighting bridge 307 is arranged at least to receive input (e.g. from switch 105) and to send lighting control commands to luminaires 101a-d.

FIG. 1 also shows a user 309 and user device 311 such as a smart phone. The user device 311 is operatively coupled to the lighting bridge 307 by a wired or wireless connection (e.g. WiFi or ZigBee) and hence forms part of the lighting network. User 309 can provide user input to the lighting bridge 307 via the user device 311 using, for example, a graphical user interface of the user device 311. The lighting bridge 307 then interprets the user input and sends control commands to the luminaires 101a-d accordingly. As mentioned above, the user device 311 generally allows for more complex control than the switch 105. For example, the user 309 may use the user device 311 to control an individual luminaire. In general it is desirable that the switch to control the luminaires in the same environment as the switch itself, i.e. in FIG. 1 switch 105 controls only luminaires 101a-d, but the user device 311 may control any luminaire at all within the lighting network. For example, the user 309 may use the user device 311 to control a luminaire in another environment, such as controlling a luminaire in a different room other than the room in which the user 309 and user device 311 are currently. This is particularly advantageous because the user device 311 is generally more portable than a switch (particularly a wall-mounted switch), and hence may be used at different physical locations. The user device 311 may be used to control the plurality of luminaires 101a-d to render a lighting scene, e.g. by the user 309 selecting the lighting scene and desired luminaires using a GUI of the user device 311.

As illustrated in FIG. 1, lighting bridge 307 may also be provided with a wide area network (WAN) connection such as a connection to the internet 313. This connection, as known in the art, allows the lighting bridge 307 to connect to external data and services such as memory 315. Note that the wireless connection between user device 311 and the lighting bridge 307 is shown in FIG. 1 as a direct connection, but it is understood that the user device 311 may also connect to the lighting bridge 307 via the internet 313.

A sensor 107 is present within the environment 103 and is arranged to detect the presence of users within the environment 103. The sensor 107 is part of the lighting network in that it is arranged to communicate with the network via a wired or wireless connection. That is, the sensor 107 is arranged to at least be operatively coupled to the lighting bridge 307.

Although shown in FIG. 1 as a single entity, it is understood that any suitable sensor or plurality of sensors may be used to provide the functionality ascribed herein to the sensor 107. For example, the sensor 107 may comprise a sensor arranged to detect the presence of users directly, such as a near infra-red sensor, a camera, an ultrasonic sensor, or other sensors known in the art. As a further example, the sensor 107 may comprise a sensor arranged to detect the presence of users indirectly, e.g. by detecting the presence and/or location of a user device 311 carried by the user. In this case, the sensor 107 may comprise a plurality of signaling beacons arranged to communicate with the user device 311 to determine its location, as known in the art. The sensor 107 may comprise a motion sensor arranged to detect motion within the environment 103 and hence detect the presence of a person within the environment 103.

In general, the sensor 107 is arranged to detect presence indications within the environment 103 which allow the presence of at least one human user within the environment 103 to be determined. Note that a lack of presence indications is suggestive of there being no human users within the environment 103, but is not definitive. For example, a lack of motion presence indications may result from a stationary user. Presence indications include, for example, motion within the environment 103, heat sources within the environment 103, sound within the environment 103, or any other indication which may directly or indirectly indicate the presence of a human within the environment 103.

In operation, the luminaires 101a-d render a lighting scene which was previously selected by the user 309 e.g. via switch 105 or user device 311. The scene may be associated with a scene type and name (and other associated data) which, as mentioned above, are useful in that they allow a likely activity of the user 309 within the environment 103 to be inferred.

As long as presence of the user 309 within the environment 103 is continued to be detected by the sensor 107, the luminaires 101a-d continue to render the sunset scene. For example, the sensor 107 may take measurements at intervals (e.g. every second) in which case the presence of the user 309 may be considered ongoing if the sensor 107 detects the presence of the user 309 every second. Alternatively, the sensor 107 may output data every time there is an update to the detected presence value. In this case the presence of the user 309 may be considered ongoing until the output of the sensor 107 indicates that the presence is no longer detected. In either of these cases, it is appreciated that the output of the sensor 107 may not be continuous, however it is not excluded that the sensor 107 may provide presence detection values in substantially real-time.

The sensor 107 may output only data indicative of a positive presence determination (i.e. that the user 309 is detected within the environment 103) but may additionally be configured to output negative presence determinations (i.e. that the user 309 is not detected within the environment 103).

If no presence indications are detected within a timeout duration (also called a time delay, threshold delay) then the luminaires 101a-d switch to a low power mode (e.g. an "off" state, or a "dimmed" state relative to the selected lighting scene which was being rendered when the user 309 was in the environment 103 by reducing their luminous intensities). "Low Power Mode" means the luminaires are consuming less power than when rendering the selected lighting scene. "Off State" in this context means "non-emitting" though the luminaires may still consume some power to maintain connected lighting functionality when off in this sense.

In the present invention, the timeout duration is determined automatically based on at least the lighting scene currently selected by the user and being rendered by the luminaires 101a-d.

Figure 2:
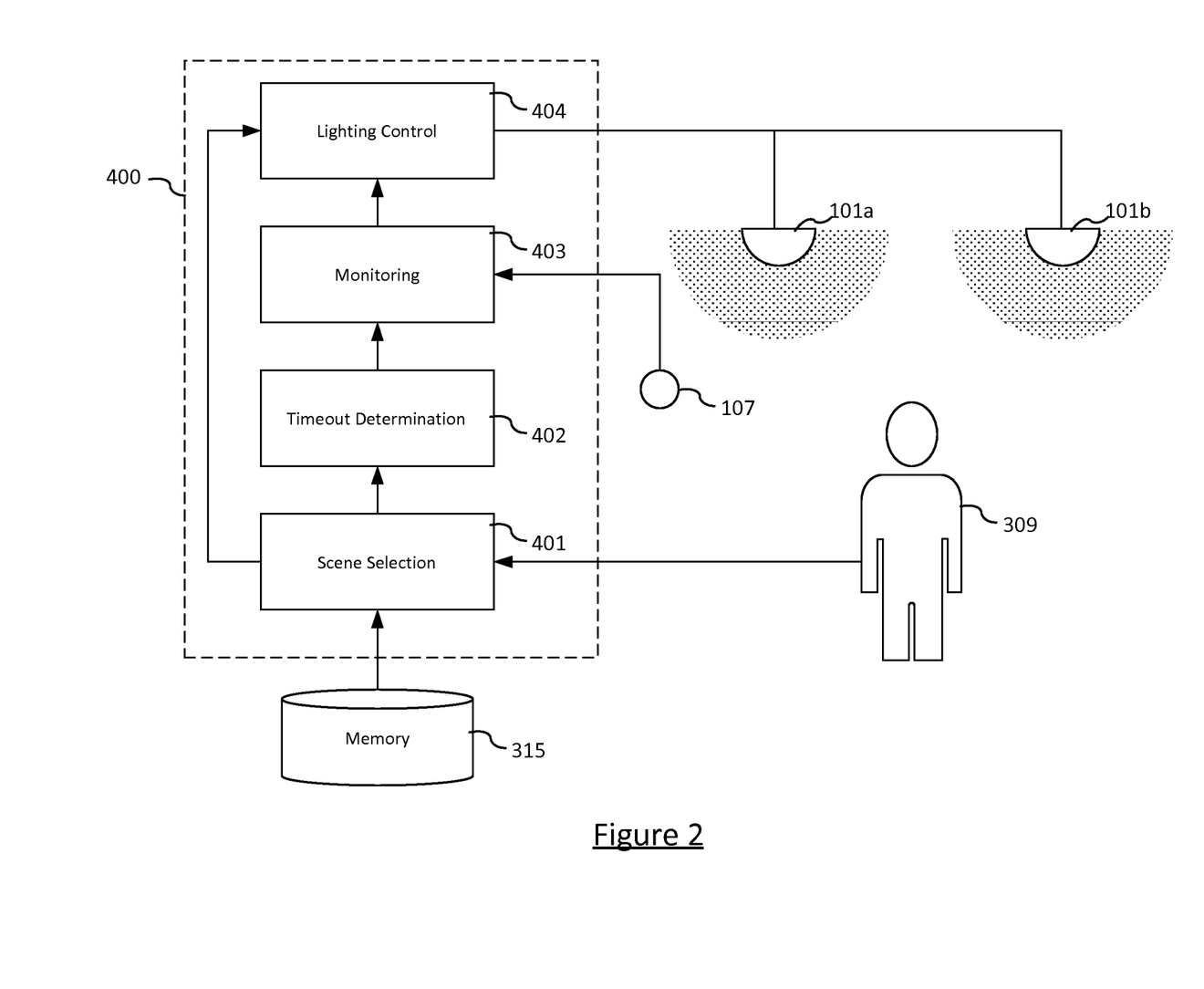
FIG. 2 is a functional block diagram of a controller according to embodiments of the present invention.

FIG. 2 shows a diagram of a controller system or controller 400. The controller 400 is shown in FIG. 2 s comprising function blocks: scene selection 401, timeout determination 402, monitoring 403, and lighting control 404.

Scene selection module 401 is arranged to receive a user selection of a scene from user 309 (e.g. via user device 311 or switch 309) and fetch the associated scene data from memory 315. For example, the user selection may be a name of a scene, in which case the scene selection module 401 queries memory 315 for that scene name and retrieves the associated data such as specific color values for each luminaire 101a-d. Scene selection module 401 then provides the scene information to lighting control module 404 which converts the scene data from the scene selection module 401 into control commands suitable for being transmitted to each of the luminaires 101a-d for rendering. Preferably implemented at the lighting bridge or at a switch such as switch 105. Which implementation is used may depend on the specific network setup. For example, if ZigBee is being used it may be preferably to implement the scene selection module 401 in the lighting bridge 307, whereas if WiFi is being used it may be preferable to implement the scene selection module 401 in the switch 105.

The scene data retrieved by the scene selection module 401 are also provided to timeout determination module 402. Timeout determination module 402 determines the timeout value to be passed to the monitoring module 403. As mentioned above, this is done by inferring an activity type from the received scene data. The timeout determination module 402 may be implemented in the user device 311, the switch 105, the lighting bridge 307, one of the luminaires 101a-d, the sensor 107, or distributed between the lighting bridge 307 and the user device 311.

The monitoring module 403 is arranged to receive presence indications from the sensor 107, as described above in relation to FIG. 1. Using the timeout value it receives from the timeout determination module 402, the monitoring module 403 is able to monitor how long it has been since the last presence indication was sensor by sensor 107 and hence determine if it is the case that no presence indications have been sensed by sensor 107 for the timeout value. If this is the case, then monitoring module 403 provides an indication to the lighting control module 404 that the luminaires 101a-d can be switched to low-power mode. The lighting control module 404, responsive to this indication, controls the luminaires 101a-d accordingly. The monitoring module may be implemented in the user device 311, the switch 105, the lighting bridge 307, one of the luminaires 101a-d, the sensor 107, or distributed between the lighting bridge 307 and the user device 311.

For example, each of the individual functional bocks of the controller 400 may be implemented together in the lighting bridge 307, one of the plurality of luminaires 101a-d, the switch 105, the sensor 107, or the user device 311. It is also understood that the individual functional blocks of the controller 400 may be implemented in a distributed manner with some functionality being implemented in one entity of the lighting system (as mentioned above) and other functionality implemented in one or more other entities of the lighting system. For example, the monitoring module 403 may be implemented as part of the sensor 107 itself, and/or as another example the scene selection module may be implemented in the user device 311.

Figure 3:
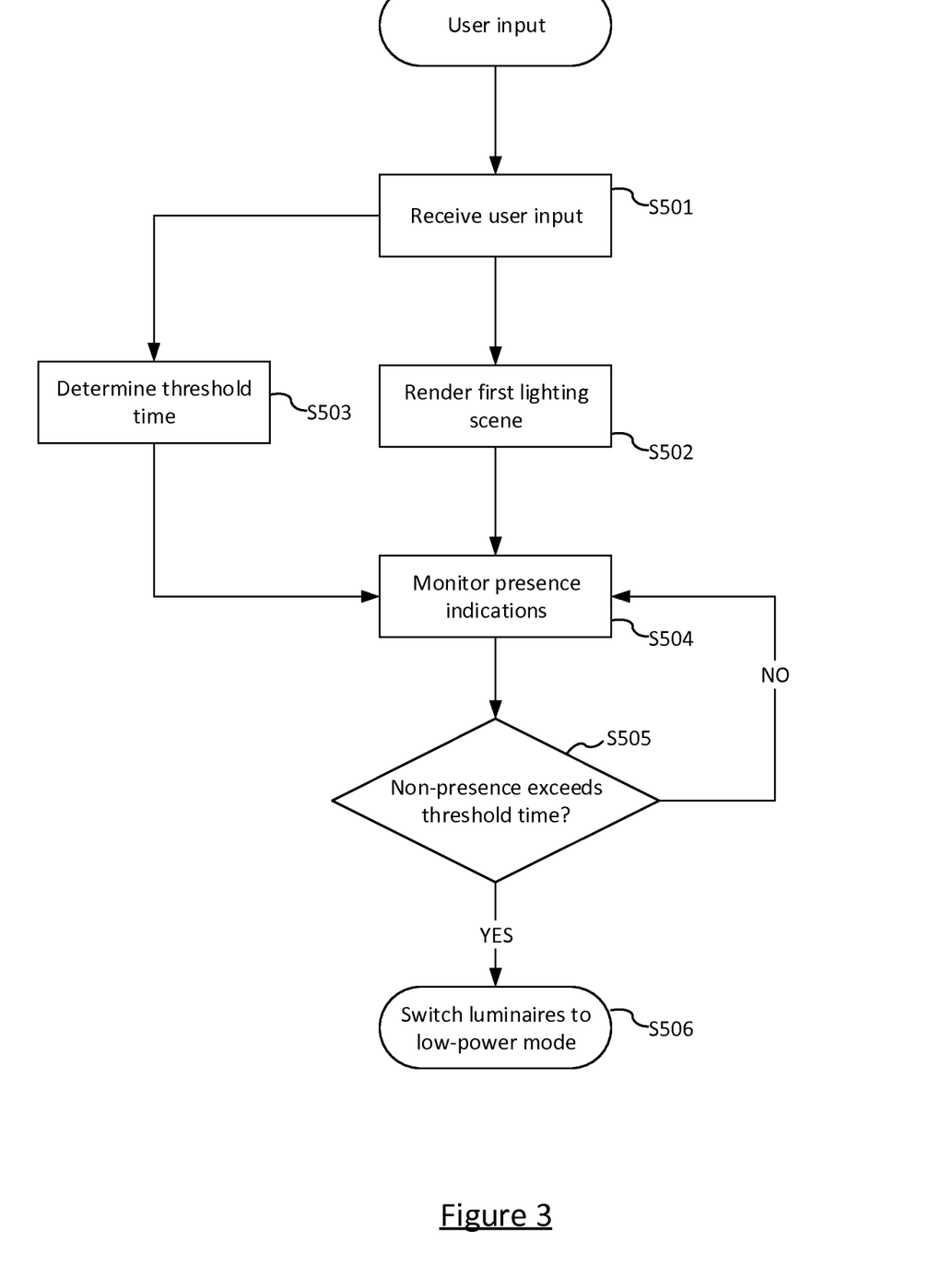
FIG. 3 is a method performed by the controller in accordance with embodiments of the present invention.

FIG. 3 is a flow diagram of a method implemented by the controller 400 in accordance with embodiments of the present invention.

At step S501, the scene selection module 401 receives user input to render a scene. In response to this, the scene selection module 401 (as described above) retrieves scene data from memory 315 and provides them to lighting control module 404.

At step S502, lighting control module 404 controls the luminaires 101a-d to render the lighting scene. This comprises controlling one or more of the luminaires 101a-d to change its illumination output.

Also in response to receiving the user input at step S501, at step S503, the timeout determination module 402 determines the threshold time based on the lighting scene data, i.e. of the lighting scene which was rendered in step S502. For example, the lighting scene may be stored in memory 315 in association with a value for the threshold time. Advantageously, memory 315 may store a plurality of possible lighting scenes and a respective plurality of threshold times. This then allows the timeout determination module 402 to determine the appropriate corresponding threshold time for the rendered lighting scene by looking up the lighting scene in memory 315 and fetching the associated threshold time.

At step S504, the monitoring module 403 monitors the environment for presence of a human user within the environment by receiving presence indications from sensor 107. Thus, it is understood that the monitoring module 403 can determine a length of time since the last presence indication was received from sensor 107. This amount of time is called a "non-presence" herein. The monitoring behavior is indicated in FIG. 3 using a flow loop. That is, at step S505, the monitoring module 403 evaluates whether or not the user non-presence identified in step S504 exceeds the threshold time determined in step S503. For example, the threshold time may be 10 seconds and therefore the monitoring module 403 evaluates whether or not the user non-presence has lasted more than 10 seconds. However, it is appreciated that the flow loop in FIG. 3 is only explanatory and the monitoring module 403 may perform steps S504 and S505 together.

If the monitoring module 403 has not received any presence indications for an amount of time equaling or exceeding the threshold time (i.e. a user non-presence is determined to have lasted more than the predetermined time), the method proceeds to step S506 wherein the monitoring module 403 indicates that the luminaires 101a-d are to be switched to the low-power mode and the lighting control module 404 controls the luminaires 101a-d accordingly.

As mentioned above, the low-power module may be an "off" mode. In this case the method of FIG. 3 amounts to the luminaires 101a-d turning off a threshold amount of time after the user 309 has left the environment 103. The low-power mode may instead be a reduced brightness mode (a dimmed mode) which still results in the technical effect of reduced energy consumption e.g. an emergency low-light level scene for providing a small amount of illumination in the environment 103. One particular advantage of this is that if the sensor 107 fails (and therefore the first lighting scene is not rendered when the user 309 enters the environment 103), then the user 309 is still able to see and navigate his way through the environment 103 safely (e.g. to fix the sensor 107). The term "low-power" is used herein to refer to lighting settings which are low-power in that they result in the lighting system using less energy than if it were to maintain the rendering of the "main" lighting scene which was selected by the user.

The threshold time is dependent on the lighting scene (i.e. the lighting scene which is rendered in response to user selection). As mentioned above, memory 315 may store a list of lighting scenes in association with a respective threshold time. Alternatively, the memory 315 may store the list of lighting scenes in association with a respective "multiplier". These multipliers then modify a default threshold time (e.g. an originally set value for the threshold time which may also be stored in memory 315 and may be either commissioned or user-set such as by user 309). For example, a "breakfast" scene having a modifier of 1, means that the threshold time remains at the original timing. If the original threshold time was 5 minutes, then the timeout would remain at 5 minutes.

Conversely, if the user 309 wants to watch television he might set the first lighting scene to be a "television" lighting scene. The television lighting scene may for example have a multiplier value of 3, because it is an activity where people typically move less. Hence, the original 5 minute threshold time would become a 15 minute threshold time. This means that it takes 3 times as long as normal for the sensor to time out.

A multiplier value of zero may be used in which case the threshold time becomes zero. The controller 400 can interpret a threshold time of zero to indicate that the lighting scene should not be removed. This essentially removes the hold time entirely and effectively disables the sensor 107. Explicit interaction from the user 309 (e.g. via switch 105 or user device 311) is then preferably required to reset the threshold time to a non-zero value, i.e. to activate the sensor 107 again.

It will be appreciated that the above embodiments have been described only by way of example. Other variations to the disclosed embodiments can be understood and effected by those skilled in the art in practicing the claimed invention, from a study of the drawings, the disclosure, and the appended claims.

For example, the present invention proposes to adapt the timeout delay based on an activity in the environment 103 which is primarily determined based on a lighting scene selection by a user 309. However, there are additional factors which can aid in the determination of the timeout delay. As examples: an environment type of the environment 103 (e.g. a room type such as "gym, "bedroom", etc.) which can be either manually entered by the user or detected by the system automatically; a manual indication by the user of an activity; an automatic determination of an activity by the system such as dependant on an application currently being run on the user device 311; or a time of day.

In the time of day example, the delay may further be scheduled based on daily routines ("go to bed routine")

In the indication example, the delay may be set manually by the user (e.g. set home automation to "do not disturb"), or can be deduced from integrated or connected (cloud)-based services (e.g., "watching television" when Netflix is active, "Listening to music" when Spotify is used). When there are sensors in the lighting system which are able to detect the type of user activity then these may also be used to set an initial delay time (for further adaption later, as described below). For example, sensor 107 may detect that a user is moving a lot within the environment 103 and therefore set the delay time to a specific initial value (e.g. 5 seconds). It is also possible to determine this initial delay time based on input from the mobile device 311 (i.e. from a user's phone or wearable device) such as a motion amount as detected by a location sensor or G-sensor.

However the activity is determined, the delay timeout is adjusted as described above. E.g. increasing the timeout for activities with a higher likelihood of generating presence indications, such as an exercise activity (more likely to generate motion presence indications).

The following is a scenario intended to make the advantages of the present invention clear:

User is in the living room and the system determines that the user is "having breakfast" (e.g., set as part of a 'Morning' routine). This is an activity where the user frequently moves and is likely to be noticed by the sensor. Therefore, the grace period (timeout) of the sensor is set to 3 minutes (example).

The user finishes his breakfast and moves over to the comfortable sofa to watch some television. This is an activity where the user may not move for longer periods of time, so the grace period of the sensor is adjusted to 45 minutes (example).

User selects the "Meditation" mode for her living room for 30 minutes. System goes in "do not disturb mode" and deactivates all sensors, notifications and other apps. After 30 minutes the light goes back into previous mode.

User selects "go-to-bed routine". At the end of the lighting transition, the activity is set to "sleeping". All switches and sensors in house recall only nightlight scenes.

The determination of the timeout from the activity may be implemented by having fixed timings in the system for specific activities. Such a database of activities could be created by the manufacturer (Philips, in this case), or other end-users in a sharing system. Either way, they may be stored locally or in external storage such as the cloud. Ideally, the database of activities should not contain a defined set, but people should be allowed to add their own custom activities and define the timing for that. Ideally, the information that people enter is available to other users/systems, so it can also be used on those systems. In any case, the timeout determination module 402 of the controller 400 is able to query the database in order to determine the appropriate timeout for the selected lighting scene.

A self-learning implementation is also possible in which the delay is determined using self-learning algorithms known in the art. Preferably, the self-learning is specific to the activity and room type. That is, the system may be enhanced with a learning algorithm where the modifiers are adjusted, based on the usage of the system by the user, e.g. if the user has also a switch to switch on/off the lights in a room (in addition to the sensor), and he uses "ON" regularly just after the sensor has reported a change of "motion" to "no motion", the modifier (or the grace period itself) should be increased. If he uses "OFF" just before a change of "motion" to "no motion" (press button before leaving the room), or shortly afterwards uses the app to switch off the lights (notice the lights are still on and switches off manually during the grace period), the modifier (or the grace period itself) could be decreased. This could result in dynamically adjusted modifiers (or timings) for the motion sensor that fit better with the actual usage of the system by the user.

As noted, the scene selection module 401, timeout determination module 402, monitoring module 403 and lighting control module 404 in FIG. 2 are functional blocks of the controller 400 providing the functionality described herein, wherever they are implemented in the system they may be implemented solely in dedicated hardware (e.g. an application specific integrated circuit and/or a field-programmable gate array), software (e.g. computer-readable code stored on a computer-readable storage medium which is arranged so as when executed to provide the functionality of the scene selection module 401 and/or the timeout determination module 402 described herein), or in a combination of hardware and software.

In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored and/or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of controlling one or more luminaires arranged to illuminate an area covered by at least one presence sensor, the method comprising:
   receiving from a user a selection of a lighting scene to be rendered;
   determining an activity in the area based on the selected lighting scene;
   controlling at least one of the luminaires to render the selected lighting scene;
   determining a timeout duration for the luminaires based on the determined activity;
   using the at least one presence sensor to monitor the area for presence indicators when rendering the selected lighting scene; and
   automatically switching the luminaires to a low-power mode if no presence indicator is detected in the area for the determined timeout duration when rendering the selected lighting scene.

2. The method according to claim 1, wherein said presence indicators comprise one or more of: movement within the area; heat sources within the area; and sound sources within the area.

3. The method according to claim 1, wherein the luminaires are switched to the low-power mode by switching them to a non-emitting state.

4. The method according to claim 1, wherein the luminaires are switched to the low-power by reducing a luminous intensity of the luminaires.

5. The method according to claim 1, wherein the activity is also determined based on at least one brightness, hue, or saturation of the selected lighting scene.

6. The method according to claim 1, wherein the selected lighting scene is performed based on a name or type of the selected lighting scene.

7. The method according to claim 6, wherein the activity in the area is further determined based on an area type of said area.

8. The method according to claim 7, wherein the activity in the area is further determined based a time of day.

9. The method according to claim 8, wherein the activity in the area is further based on data indicating an application being used in the area.

10. The method according to claim 1, wherein determining said timeout duration comprises determining a timeout multiplier based on the selected lighting scene and applying the timeout multiplier to a default timeout duration.

11. The method according to claim 7, wherein the area type of said area is manually entered by the user.

12. The method according to claim 7, wherein the area type of said area is automatically detected.

13. A controller for controlling one or more luminaires arranged to illuminate an area covered by at least one presence sensor, the controller comprising:
   a scene selection module arranged to receive from a user a selection of a lighting scene to be rendered;
   a lighting control module arranged to control at least one of the luminaires to render the selected lighting scene;
   a timeout determination module arranged to determine an activity in the area based on the selected lighting scene and further to determine a timeout duration for the luminaires based on the determined activity;
   a monitoring module arranged to receive presence indications from the at least one presence sensor;
   wherein the lighting control module is arranged to switch the luminaires to a low-power mode if no presence indications are received for the determined timeout duration when rendering the selected lighting scene.

14. A computer program product comprising computer-executable code embodied on a computer-readable storage medium configured so as when executed by one or more processing units to perform the method according to claim 1.

\* \* \* \* \*